(12) United States Patent  (10) Patent No.: US 7,767,934 B2
Christopher et al.  (45) Date of Patent: Aug. 3, 2010

(54) TORCH FEED ROLL ADJUSTMENT LEVER

(75) Inventors: Mark R. Christopher, Neenah, WI (US); Jim Maynard, Appleton, WI (US); Jerry Piechowski, Hortonville, WI (US)

(73) Assignee: Illinois Took Works Inc., Glenview, IL (US)

( * ) Notice: Subject to any disclaimer, the term of this patent is extended or adjusted under 35 U.S.C. 154(b) by 1244 days.

(21) Appl. No.: 11/148,879

(22) Filed: Jun. 9, 2005

(65) Prior Publication Data

US 2006/0278624 A1    Dec. 14, 2006

(51) Int. Cl.
   *B23K 9/12* (2006.01)
(52) U.S. Cl. ............ 219/137.7; 219/137.2; 219/137.31
(58) Field of Classification Search ............ 219/137.44, 219/137.7, 137.71
   See application file for complete search history.

(56) References Cited

U.S. PATENT DOCUMENTS

| 3,055,591 | A | * | 9/1962 | Shepard | ................. | 239/13 |
|---|---|---|---|---|---|---|
| 4,527,037 | A | * | 7/1985 | Johnson et al. | ............ | 219/69.1 |
| 4,703,156 | A |   | 10/1987 | Hayes | | |
| 4,954,690 | A |   | 9/1990 | Kensrue | | |
| 6,568,578 | B1 |   | 5/2003 | Kensrue | | |
| 2003/0015510 | A1 | * | 1/2003 | Wakeman | ............... | 219/137.31 |
| 2005/0016976 | A1 | * | 1/2005 | Belfiore et al. | ........... | 219/137.2 |

FOREIGN PATENT DOCUMENTS

WO    0128728    A2    4/2001

\* cited by examiner

*Primary Examiner*—Stephen J Ralis
(74) *Attorney, Agent, or Firm*—Fletcher Yoder P.C.

(57) ABSTRACT

A torch and a welder having a torch constructed to pull a consumable weld wire thereto are disclosed. The torch includes a wire feeder assembly having a first feed roll and a second feed roll. Operation of the feed rolls pulls a consumable weld wire to the torch. A lever selectively separates the first and the second feed rolls and is securable to allow a hands-free separation of the feed rolls.

12 Claims, 7 Drawing Sheets

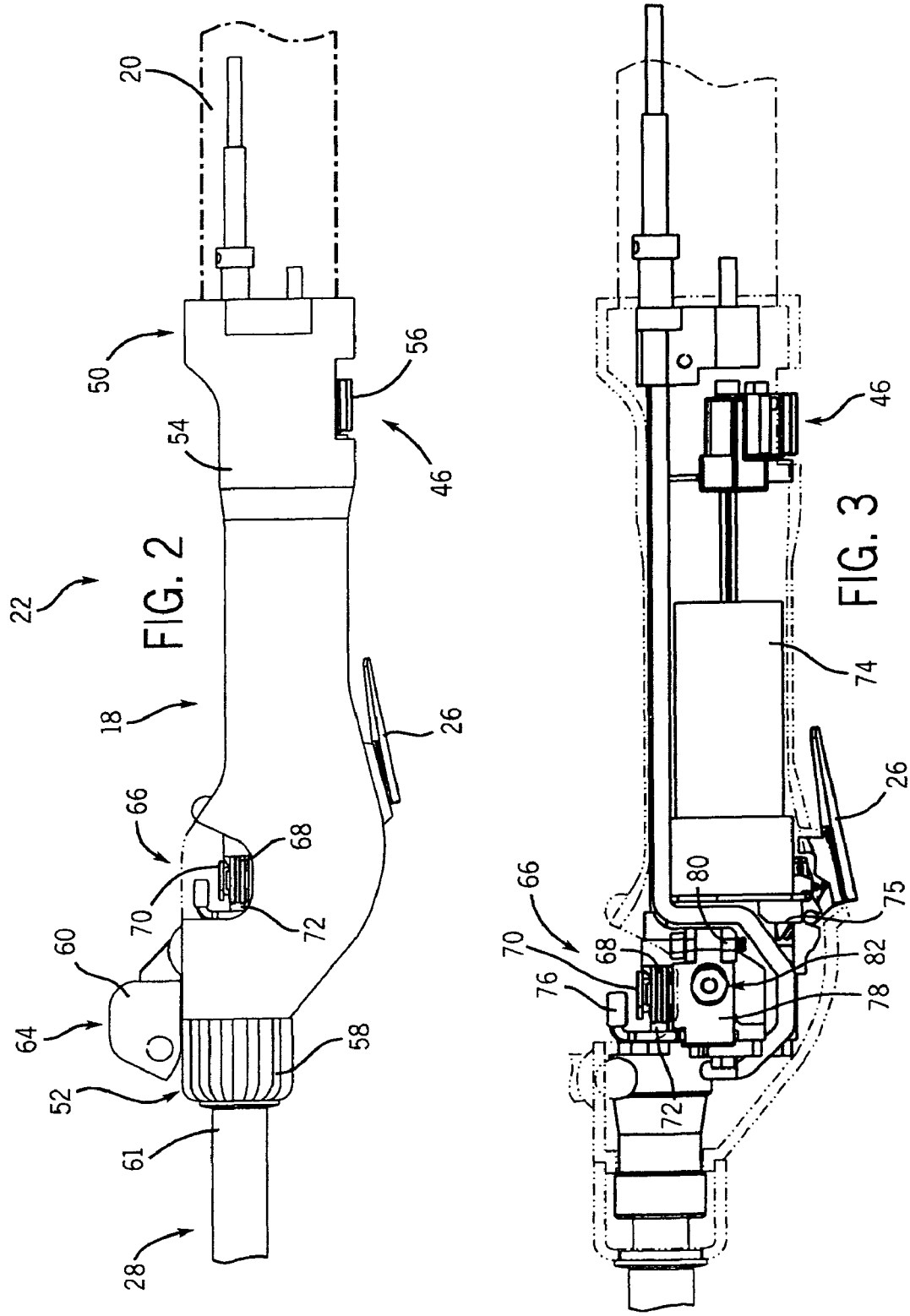

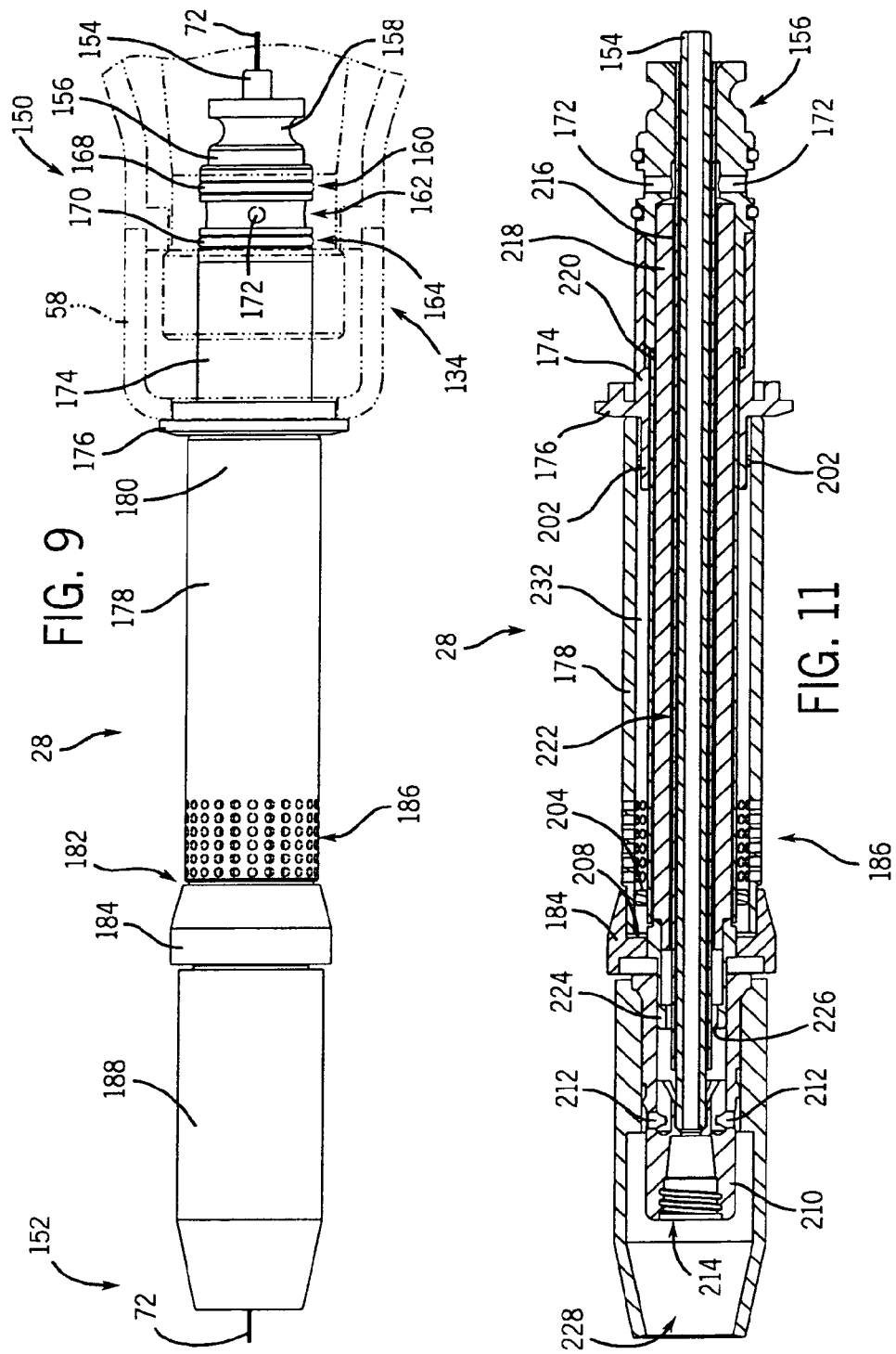

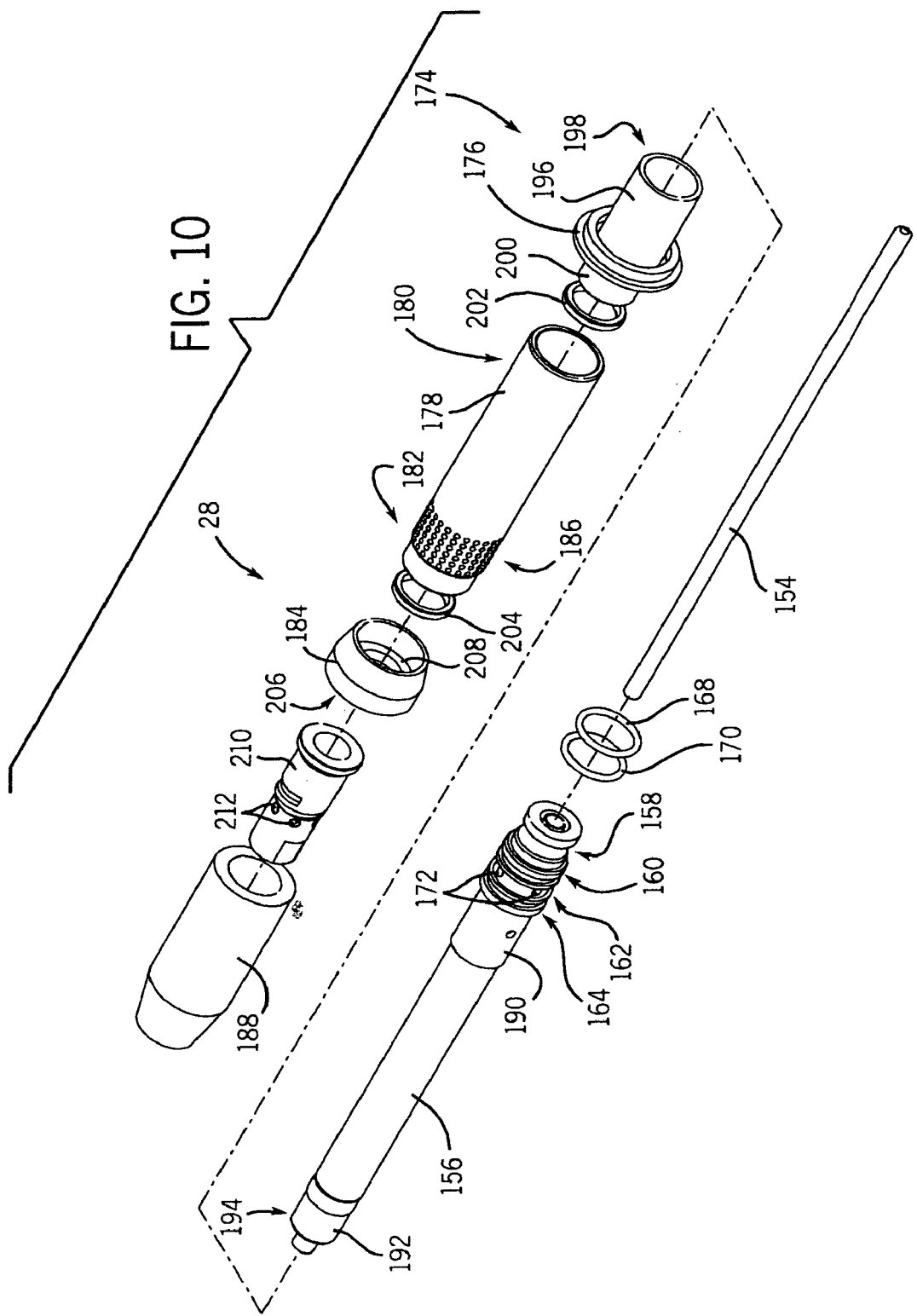

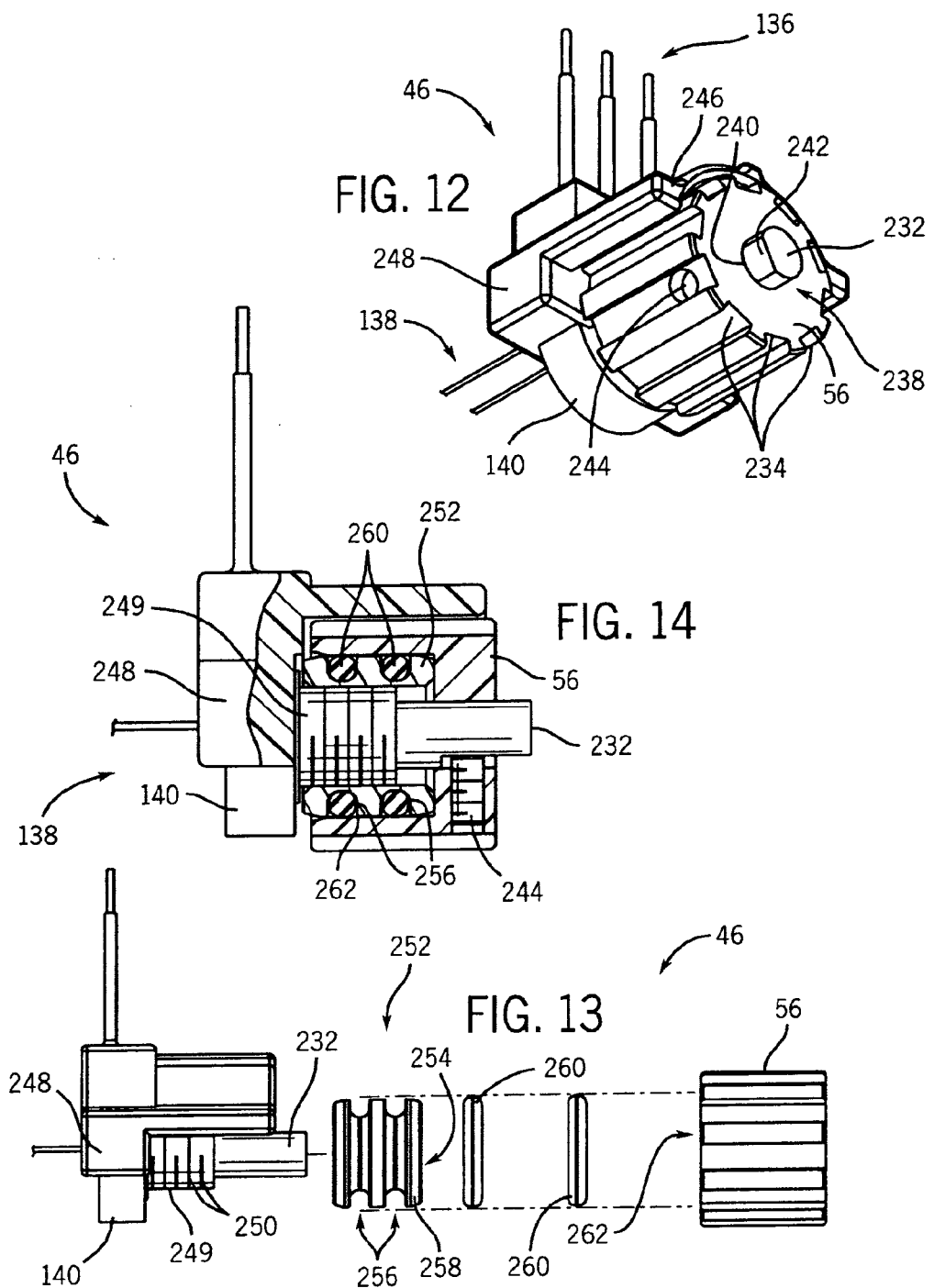

TORCH FEED ROLL ADJUSTMENT LEVER

BACKGROUND OF THE INVENTION

The present invention relates generally to welding-type systems and, more particularly, to a welding torch operable with such systems.

Welding-type systems generally include a power source constructed to generate a welding-type power. The welding-type power is communicated to a torch assembly or a welding gun via a weld cable that extends between the torch and the power source. Some systems include a consumable weld wire that is fed to the torch. The consumable weld wire can be pushed or pulled using a single motor wire feeder, or can be push/pulled by a dual motor wire feeder having a first motor near the power source and a second motor nearer to, or supported by the torch. During a welding process, actuation of a trigger of the torch actuates the motor(s) thereby delivering the consumable weld wire from the torch to a weld.

Torches that include a wire feed assembly, commonly referred to as a wire feeder, allow for operation of the torch at greater distances from a power source and/or use of consumable weld wires that are incapable of being only pushed to the torch. That is, if the distance between the wire feed assembly and the torch is too great, the wire feed assembly will not be able to overcome the friction or drag associated with pushing the weld wire to the torch. Additionally, some consumable weld wires cannot support the stresses associated with being pushed and/or pulled from the power source to the torch and must therefore be located at the torch and delivered to a weld therefrom. Positioning the wire feed assembly on the torch also allows for efficient control and operation of the wire feed assembly. An operator is not required to return to the power source to adjust the wire feed assembly.

During a welding process, the consumable weld wire passes between a pair of the rolls of the wire feed assembly. The wire feed assembly includes a motor that operatively engages at least one roll of a pair of rolls. Operation of the motor rotates the roll and thereby moves the consumable weld wire through the torch and to a weld. The rolls are often separable to allow the initial positioning of the consumable weld wire therebetween. This process is often referred to as "threading" of the wire feed assembly and requires that the rolls be located in a threading position. When located in the threading position, the rolls are moved apart to form a gap between the rolls. This gap is generally large enough to allow the consumable weld wire to move freely between the rolls. Once the consumable weld wire is positioned between the pair of rolls, the rolls are positioned snuggly against the wire, or in a feed position, such that rotation of the rolls "feeds" the weld wire through the wire feed assembly. This threading of the wire feed assembly must be repeated every time a terminal end of the consumable weld wire exits the rolls or an operator desires an alternative consumable weld wire.

A cam is often employed to separate the rolls so that the consumable weld wire can be thread therepast. The cam can engage one roll or both rolls and, when actuated, forms the separation between the rolls necessary to pass the consumable weld wire freely therebetween. These cams require constant operator actuation to maintain the separated condition of the rolls. This requires an operator to maintain hand contact with the cam at all times during the threading process. Additionally, once a threading process has begun, if the consumable weld wire, the spool the consumable weld wire is mounted upon, the weld cable, the power source, or any other component of a welding system requires adjustment, the operator only has one hand available to make such adjustments while maintaining the rolls in the separated position. Occasionally, during a threading process, the consumable weld wire may become stuck in the weld cable which communicates the consumable weld wire to a torch. Freeing of the consumable weld wire often requires manipulation of the weld cable to allow the continued passage of the weld wire therethrough. If the operator requires two hands to manipulate the weld cable to free the consumable weld wire, the threading process must be suspended until the manipulation of the weld cable is complete. That is, the cam must be released and later re-engaged to continue the threading process every time a two-handed adjustment of the welding system is required during a threading process. Accordingly, such wire feed assemblies often require an operator to repeatedly open and close the rolls of the wire feed assembly during a threading process. As such, manually passing the consumable weld wire through the wire feed assembly can be a time consuming and frustrating process.

Once the consumable weld wire has been threaded to the torch, the weld wire can be delivered automatically therefrom by the wire feed assembly. Occasionally, responsive to arc/weld performance, an operator needs to adjust the rate of delivery, or feed speed, of the consumable weld wire. The wire feed assembly often includes a control connected to the motor of the wire feed assembly to facilitate adjustment of the wire feed speed. Welding systems that have a wire feed assembly supported on the welding torch also often have a feed control supported thereon. Positioning the feed control on the torch eliminates an operators repeated trips away from a workpiece and/or torch assembly to adjust the wire feed speed. The feed control often includes a knob or dial that is accessible through a housing or handle of the torch. The knob is connected to a shaft of the control such that rotation of the knob adjusts the signal output from the control. Although mounting the wire feed control in the torch is convenient and efficient for operator manipulation of the control, it is not without its drawbacks.

A control that is supported by the torch is also subject to the movements and impacts subjected to the torch. That is, during a welding process, the torch can be repeatedly subjected to impacts. For example, during welding processes, slag can collect in a nozzle of the torch. Rather than removing the nozzle from the torch to remove the slag therefrom, some operators tap the torch on a work surface to remove the slag from the nozzle. Occasionally, attempting to ensure that the torch and weld cable are clear of a work area, an operator will manipulate a position of the torch by manipulation of the weld cable. Understandably, the torch, and any components supported thereon, must be ruggedly constructed to withstand these and other rigors associated with a workplace and weld processes. Not only do the impacts to the torch affect the operation of the wire feeder attached to the torch, they can also affect the setting of the feed control connected thereto.

Each impact that the torch is subjected to also imparts a portion of these forces on the components of the feed control. Occasionally, these forces result in inadvertent adjustment of the feed control. In addition to the impact forces the torch is subjected to, the torch is also repeatedly gripped and released during a welding process. This repeated gripping and releasing of the torch can also result in inadvertent adjustment of the feed control. That is, the feed control may inadvertently and unknowingly experience an adjusting contact with an operator's clothes or gloves, a workpiece, or other workplace obstructions such as a workpiece. Accordingly, if an operator does not confirm the setting of the feed control with each successive gripping of the torch, actuation of the trigger of the torch would result in operation of the wire feed assembly at an undesired feed speed. Attempting to weld at a feed speed that is unknown and/or undesired will result in poor, if any, weld arc performance.

Maintaining the wire feed speed at a desired value for the duration of a welding process allows for efficient and extended operation of the welding torch. Accordingly, a single operator of the welding torch can achieve greater efficiency with decreased delay between successive weld processes. Such efficiency achieves extended periods of welding system operation by an individual operator. As such, operator fatigue must also be considered in constructing such torches. The weight, ergonomic impact, and operating temperature of the torch are only three of many considerations that must be addressed in constructing a torch that can be operated for extended periods by a single operator. Torches are often operated by a single hand of an operator thereby allowing for workpiece manipulation by the operator's free hand. The torch must be constructed to comfortably fit in a grip of an operator. This requirement often requires miniaturization of internal components of the torch and a handle assembly that can support the heat and power requirements associated with extended operating periods. Often times, the conductors that communicate the welding power through the torch include several individual conductors that extend along the length of the torch handle. Multiple conductors allows the torch to accommodate other components, such as a trigger assembly and/or a wire feed assembly, while maintaining a single hand graspable torch. Additionally, partitioning the weld power across several conductors reduces the amount of heat generated by each individual conductor as compared to a torch required to communicate the same weld power through the torch over fewer conductors. However, diversifying the weld power across the several conductors does not decrease the total amount of heat generated in the torch assembly by the communication of the weld power therethrough.

In addition to the weld power, a weld gas is also communicated through the torch assembly to a weld. The weld gas is often directed through one of the weld power conductors rather than providing a dedicated conduit for the weld gas. Passing the weld gas through a single conductor provides an adequate flow of weld gas to a weld process and provides some degree of cooling of the torch assembly. However, temperature of the torch assembly is an issue when the torch is operated for extended durations and at increased weld powers. That is, the passage of weld gas through a single conductor of the torch assembly limits the amount of weld power and the duration of weld intervals that a torch can provide. Other torches utilize a water cooling loop that circulates a fluid cooling flow the conductors of the torch. Such torches can operate at higher weld powers as compared to torches having weld gas cooling systems but are difficult to maintain and more expensive to manufacture and operate. Such torches must be fluidly connected to a reservoir and pump to circulate the cooling fluid therethrough. Additionally, such torches require that at least two of the conductors be fluidly connected within the torch to form a circulation loop for the cooling flow. Accordingly, these torches require complex assembly and precision manufacture to ensure that the fluid loop is isolated from the other components of the torch.

In addition to the heat generated by the communication of the weld power through the handle of the torch, the portion of the torch that extends beyond the handle portion, or the barrel assembly, is also susceptible to thermal accumulation. A nozzle is positioned at a distal end of the torch assembly and is positioned in very close proximity to a weld during a welding process. The barrel assembly is generally disposed between the nozzle and the handle portion of the torch. As the consumable weld wire is discharged from the handle portion of the torch, the barrel assembly directs the consumable weld wire and the weld gas delivered from the torch assembly to a weld. The close proximity of the barrel assembly to the weld process exposes the barrel assembly to the considerable thermal energy associated with a weld process. That is, the barrel assembly experiences convection and radiation heating due to its proximity to a welding operation.

In addition to the convection and radiation heating of the barrel assembly, a portion of the heat communicated to the barrel assembly is conducted through internal components of the barrel assembly. A plurality of tubes is internal to the barrel assembly and isolates the communication of the consumable weld wire, weld power, and weld gas to a weld. As the weld wire is consumed during a welding process, heat is conducted along the length of the weld wire into the barrel assembly. Some of this heat is transferred to the plurality of tubes and therefrom to an exterior surface of the barrel assembly. Similarly, the nozzle of the torch assembly is supported by the barrel assembly and located in close proximity to the weld pool during a welding process. As such, heat collected in the nozzle is also conducted to the barrel assembly.

The length of the nozzle and barrel assembly, in addition to the gap between the torch and the workpiece, is often all that determines the distance of an operator's hand from the weld pool. That is, a trigger of the torch is often mounted on the torch assembly in relatively close proximity to the barrel assembly. As such, an operator is often exposed to the heat that is accumulated in the barrel assembly of the torch. Even located in a heavy glove, an operator's hand can still perceive and be subjected to the heat of the barrel assembly of the torch. Occasionally, after extended periods of torch operation, the accumulation of heat in the barrel assembly can result in an operator's inability or unwillingness to operate the torch, or if unaddressed, result in damage to the barrel or the torch assemblies.

It would therefore be desirable to provide a torch assembly that has a wire feed assembly having a pair of rolls securable in a position necessary to pass a consumable weld wire freely between. It would further be desirable to provide a feed control for the wire feed assembly that is resistant to inadvertent adjustment of the control. It also would be desirable to have a torch assembly having a plurality of weld gas passages formed therethrough. Additionally, it would also be desirable to provide a barrel assembly that thermally separates an outer surface of the barrel assembly from the internal components thereof.

BRIEF DESCRIPTION OF THE INVENTION

The present invention provides a torch and a welder assembly that solves the aforementioned problems. The torch is constructed to pull a consumable weld wire thereto. The torch includes a wire feeder assembly having a first feed roll and a second feed roll wherein operation of the feed rolls pulls a consumable weld wire to the torch. A lever selectively separates the first and the second feed rolls and is securable to allow a hands-free separation of the feed rolls.

Therefore, in accordance with one aspect of the present invention, a torch assembly is disclosed. The torch assembly includes a first feed roll and a second feed roll attached to a body of the torch. The second feed roll is movable between a feed position and a thread position. The torch assembly includes a control constructed to move the second feed roll and a lock. The lock is constructed to selectively maintain the second feed roll in the thread position.

According to another aspect of the present invention, a welding torch having a wire feeder connected to a body is disclosed. The wire feeder includes a first roll, a second roll, and a lever. The lever is pivotably connected to the body and is constructed to operatively engage at least one of the first roll and the second roll. The lever is biased out of engagement with at least one of the first roll and the second roll and securable in an engaged position.

In accordance with a further aspect of the present invention, a welder having a torch connected to a power source is disclosed. The power source is constructed to generate a power signal suitable for welding applications. A wire feeder is attached to the torch and includes a pair of rolls. The pair of rolls is constructed to pull a consumable weld wire to the torch. A link is pivotably connected to the torch and movable between a first position and a second position. When the link is in the second position, the link maintains a hands-free separation of the pair of rolls.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 2 is an elevational view of the torch assembly shown in FIG. 1.

FIG. 3 shows the torch assembly shown in FIG. 2 with a portion of the housing removed therefrom exposing a wire drive assembly of the torch assembly.

FIG. 9 is an elevational view of a barrel assembly of the torch assembly shown in FIG. 2.

FIG. 10 is an exploded view of the barrel assembly shown in FIG. 9.

FIG. 11 is a cross-sectional view of the barrel assembly shown in FIG. 9.

FIG. 12 an isometric view of the feed control assembly removed from the torch assembly shown in FIG. 2.

FIG. 13 is an exploded view of the feed control assembly shown in FIG. 12.

FIG. 14 is a cross-sectional view of the feed control assembly shown in FIG. 12.

DETAILED DESCRIPTION OF THE PREFERRED EMBODIMENT

Figure 1:
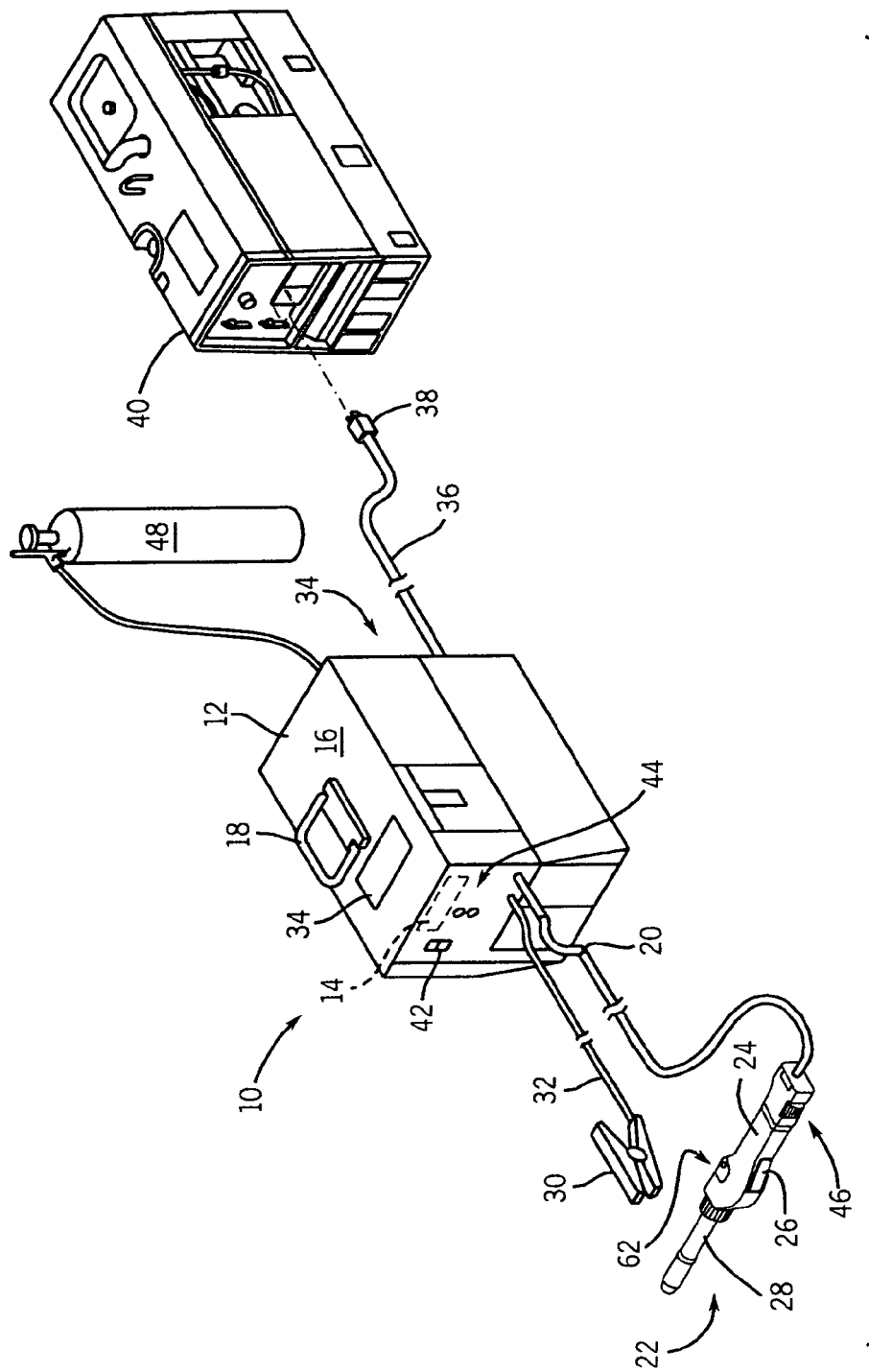
FIG. 1 is a perspective view of a torch assembly attached to a welding-type system according to the present invention.

FIG. 1 shows a welding-type system 10 according to the present invention. Welding-type system 10 includes a power source 12 to condition raw power and generate a power signal suitable for welding-type applications. Power source 12 has a processor 14 within a housing 16 that monitors the operating condition of welding-type system 10. Power source 12 includes a handle 18 attached to housing 16 to effectuate a transportation of power source 12 from one site to another. A cable 20 connects a welding gun or torch assembly 22 to power source 12. Cable 20 communicates weld power, compressed air or weld gas, and a consumable weld wire to torch assembly 22. Torch assembly 22 includes a handle portion 24, or torch body, having a trigger 26 thereon and a barrel assembly 28 extending therefrom. Although shown as attached to torch assembly 22, it understood and within the scope of the claims that trigger 26 be connected to power source 12 or otherwise remotely positioned relative to torch assembly 22.

Also connected to power source 12 is a work clamp 30 which is designed to connect to a workpiece (not shown) and provide a grounding or return path. Connecting work clamp 30 to power source 12 is a cable 32 designed to provide the return path, or grounding path, for the welding power from torch assembly 22 through the workpiece and work clamp 30. Extending from a rear portion 34 of power source 12 is a power cable 36 having a plug 38 for connecting power source 12 to either a portable power supply 40 or a transmission line power receptacle (not shown). Power source 12 includes an ON/OFF switch 42 and may also include an amperage control, a voltage control, selector switches, weld gas pressure regulation controls, indicator lights, and/or the like 44.

To effectuate a welding-type process, barrel assembly 28 of torch assembly 22 is generally pointed to a workpiece connected to work clamp 30. Activation of trigger 26 delivers weld power, consumable weld wire, and weld gas to a desired weld area. Maintained activation of trigger 26 allows the user to perform extended welding-type processes while moving torch assembly 22 across the workpiece. The user may adjust the delivery speed or feed speed of the consumable weld wire by manipulation of a feed control 46 attached to torch assembly 22. Weld gas or a shielding gas is supplied to a weld from a pressurized gas source 48 fluidly connected to torch assembly 22.

FIG. 2 shows an elevational view of torch assembly 22. Cable 20 removeably connects torch assembly 22 to power source 12 and communicates welding power, a consumable weld wire, and weld gas to the torch assembly. Torch assembly 22 includes a first end 50 connected to cable 20 and a second end 52 having barrel assembly 28 connected thereto. A housing 54 extends about handle portion 24 of torch assembly 22 between first end 50 and second end 52. Trigger 26 and a dial 56 of feed control 46 extend through housing 54 and are positioned to allow convenient, single handed, operator manipulation thereof, respectively. A collar 58 is rotatably attached to housing 54 and engages a torch end 61 of barrel assembly 28 and secures the barrel assembly 28 to torch assembly 22. Although barrel assembly 28 is shown as having a relatively straight configuration, it is understood that the barrel assembly could have other orientations such as a slightly bent construction. A cover or door 60 is pivotally attached to housing 54 between first and second ends 50, 52 and is positioned on torch assembly 22 generally opposite trigger 26 and dial 56. Door 60 is rotatable between a closed position 62, shown in FIG. 1, and an open position 64, shown in FIG. 2.

As shown in FIG. 2, open position 64 of door 60 exposes a wire drive assembly 66 of torch assembly 22. Wire drive assembly 66 includes a first feed roll 68 and a second feed roll 70. Wire drive assembly 66 delivers a consumable weld wire 72 from power source 12 to torch assembly 22. Wire drive assembly 66 is configured to cooperate with a wire drive assembly positioned in power source 12 to deliver consumable weld wire 72 to a weld. Such systems are often referred to as "push-pull" type systems wherein the wire drive assembly positioned in the power source "pushes" the consumable weld wire to the torch and wire drive assembly 66 "pulls" the consumable weld wire to the torch. Such configurations provide for efficient transportation of consumable weld wire along extended weld cables. That is, where the distance between the power source and the torch assembly is too great or the consumable weld wire cannot physically support being only pushed or being only pulled to the torch, such cooperative wire drive systems provide for greater versatility of the welding-type system. Alternatively, in those applications where a consumable weld wire can support being only pulled to the torch, or where the distance between the torch and source of consumable weld wire is not significant, wire drive assembly 66 can independently deliver consumable weld wire 72 to a weld.

FIG. 3 shows torch assembly 22 with housing 54 removed therefrom. As shown in FIG. 3, wire drive assembly 66 includes a motor 74 operatively connected to feed control 46 and trigger 26. A gear box 75 drivingly connects motor 74 to second feed roll 70. Alternatively, motor 74 could be drivingly connected to only first feed roll 68 or both first and second feed rolls 68, 70. Understandably, if motor 74 is drivingly connected to both first and second feed rolls, the feed rolls rotate in directions generally opposite one another, respectively. Operation of motor 74 is controlled by actuation/deactivation of trigger 26 at a speed determined, in part, by the setting of feed control 46. Motor 74, being driving connected to second feed roll 70, rotates second feed roll 70 in a direction necessary to deliver consumable weld wire 72 to a weld.

Figures 4, 5:
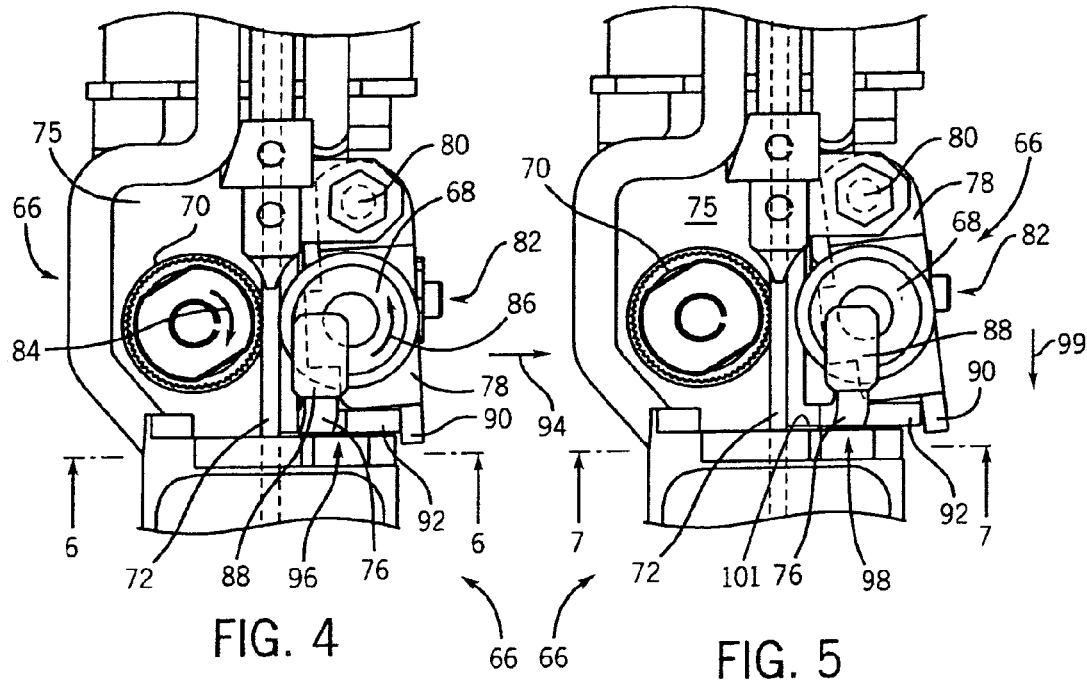
FIG. 4 is a plan view of the wire drive assembly shown in FIG. 3 with a pair of feed rolls and a lever in a first position.
FIG. 5 is a plan view of the wire drive assembly shown in FIG. 4 with the feed rolls and lever moved to a second position.

Wire drive assembly 66 includes a lever 76 pivotally connected thereto. Lever 76 operatively engages an arm 78 pivotally attached to wire drive assembly 66 by a pin 80. First feed roll 68 is rotationally mounted to arm 78. A spring assembly 82 biases arm 78 towards gear box 75 and biases first feed roll 68 into engagement with consumable weld wire 72 when the weld wire is passed through drive assembly 66. As shown in FIG. 4, consumable weld wire 72 passes between first feed roll 68 and second feed roll 70. Spring assembly 82 compresses consumable weld wire 72 between first feed roll 68 and second feed roll 70 such that rotation of second feed roll 70 in the direction indicted by arrow 84 feeds consumable weld wire 72 through wire drive assembly 66. The movement of consumable weld wire 72 past first feed roll 68 rotates first feed roll 68 in the direction indicated by arrow 86. Lever 76 includes a handle portion 88 that extends over first feed roll 68 to allow convenient operator manipulation of lever 76. A boss 90 extends from arm 78 and engages a shoulder 92 of lever 76. Lever 76 is pivotally attached to wire drive assembly 66 and is movable in the direction indicated by arrow 94. Movement of lever 76 in direction 94 displaces arm 78, with first feed roll 68 rotatably attached thereto, away from second feed roll 70.

Lever 76 and arm 78 are movable between a first position 96, shown in FIG. 4, and a second position 98, shown in FIG. 5. As shown in FIG. 5, lever 76 has been rotated in direction 94 and has disengaged first feed roll 68 from engagement with consumable weld wire 72. Movement of lever 76 in direction 94 overcomes the bias of spring assembly 82 and rotates arm 78 about pin 80. First feed roll 68 is mounted to arm 78 and moves away from second feed roll 70 attached to gear box 75 as lever 76 is moved from first position 96 to second position 98. Once rotated to second position 98, lever 76 is moved in the direction indicated by arrow 99 and engages a shelf 101 of drive assembly 66 thereby securing first feed roll 68 in second position 98. Alternatively, the engagement of shoulder 92 of lever 76 with boss 90 of arm 78 could be constructed to secure arm 78 and first feed roll 68 in second position 98. Such constructions provide a torch assembly that maintains second position 98 without continuous operator actuation of lever 76. Comparatively, first position 96, or a feed position, allows for continuous feeding of consumable weld wire 72 through torch assembly 22 while the trigger of the torch assembly is activated whereas second position 98 disengages first and second feed rolls 68, 70 from operative engagement with consumable weld wire 72.

Occasionally, an operator may be required to manually manipulate the passage of a consumable weld wire to and/or through torch assembly 22. For such instances, such as an initial passage of a weld wire to/through the torch, or a threading of the torch, an operator simply manipulates lever 76 to second position 98 shown in FIG. 5. Lever 76 locks in second position 98, or a threading position, thereby freeing both of the operators hands for manipulation of the consumable weld wire or other components of the weld system. After consumable weld wire 72 has been positioned between first feed roll 68 and second feed roll 70, the operator moves lever 76 to first position 96 thereby allowing spring assembly 82 to bias first feed roll 68 into contact with consumable weld wire 72. Spring assembly 82 slightly compresses consumable weld wire 72 between first feed roll 68 and second feed roll 70 such that when second feed roll 70 is driven by the motor, consumable weld wire 72 is moved through torch assembly 22.

Figures 6, 7:
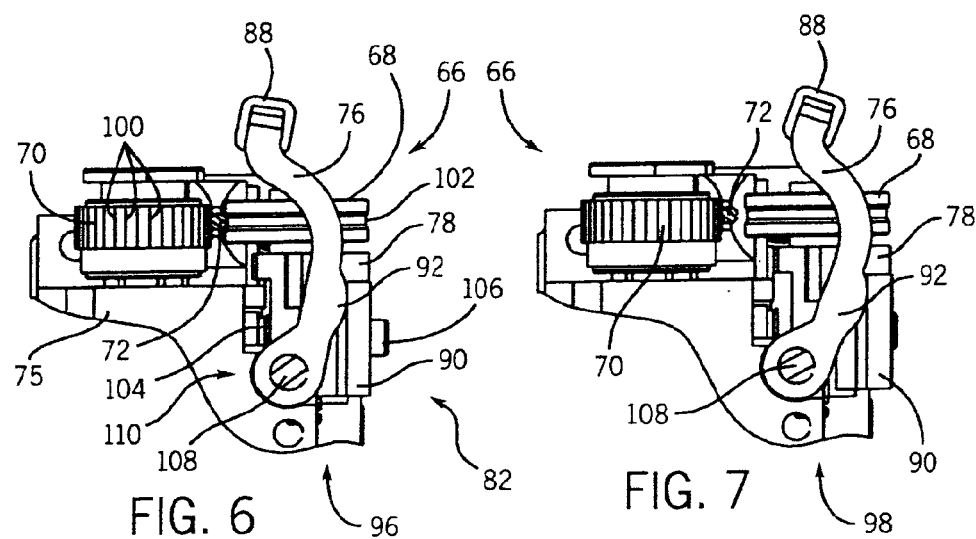
FIG. 6 is cross-sectional view of the wire drive assembly along line 6-6 shown in FIG. 4 with the feed rolls and lever in the first position.
FIG. 7 is a cross-sectional view of the wire drive assembly along line 7-7 shown in FIG. 5 with the feed rolls and lever in the second position.

As shown in FIG. 6, first position 96 positions consumable weld wire 72 snuggly between first feed roll 68 and second feed roll 70. First feed roll 68 is rotatably mounted to arm 78 and second feed roll 70 is rotatably mounted to gear box 75. Second feed roll 70 has a plurality of drive grooves 100 formed therein. Drive grooves 100 frictionally engage consumable weld wire 72 such that driven operation of second feed roll 70 by the motor of drive assembly 66 sliplessly moves consumable weld wire 72 through the drive assembly. First feed roll 68 has a groove 102 formed therein generally aligned with consumable weld wire 72. Groove 102 maintains the position of consumable weld wire 72 between first feed roll 68 and second feed roll 70. Spring assembly 82 includes a spring 104 connecting arm 78 to gear box 75. Spring 104 biases first feed roll 68 against consumable weld wire 72. Spring assembly 82 includes an adjuster 106 to allow operator manipulation of the loading of spring 104. Setting of adjuster 106 determines, in part, the amount of compression consumable weld wire 72 is subjected to when positioned between first feed roll 68 and second feed roll 70.

Lever 76 is pivotably attached to gear box 75 by a pin 108 at an end 110 of lever 76 generally opposite handle portion 88. Shoulder 92 extends from lever 76 between handle portion 88 and end 110. Shoulder 92 slidingly engages boss 90 of arm 78. As shown in FIG. 7, rotation of lever 76 about pin 108 displaces shoulder 92 relative to boss 90 of arm 78 and secures arm 78 in second position 98. Second position 98 disengages first feed roll 68 and second feed roll 70 from operative engagement with consumable weld wire 72 thereby allowing manual manipulation of consumable weld wire 72 between feed rolls 68, 70. Maintaining first feed roll 68 in second position 98 frees both of an operators hands for threading of consumable weld wire 72 through drive assembly 66. Once an operator has positioned consumable weld wire 72 between first feed roll 68 and second feed roll 70, the operator engages handle portion 88 of lever 76 to return lever 76, arm 78, and first feed roll 68 to first position 96 shown in FIG. 6 thereby drivingly engaging first feed roll 68 and second feed roll 70 with consumable weld wire 72.

Figure 8:
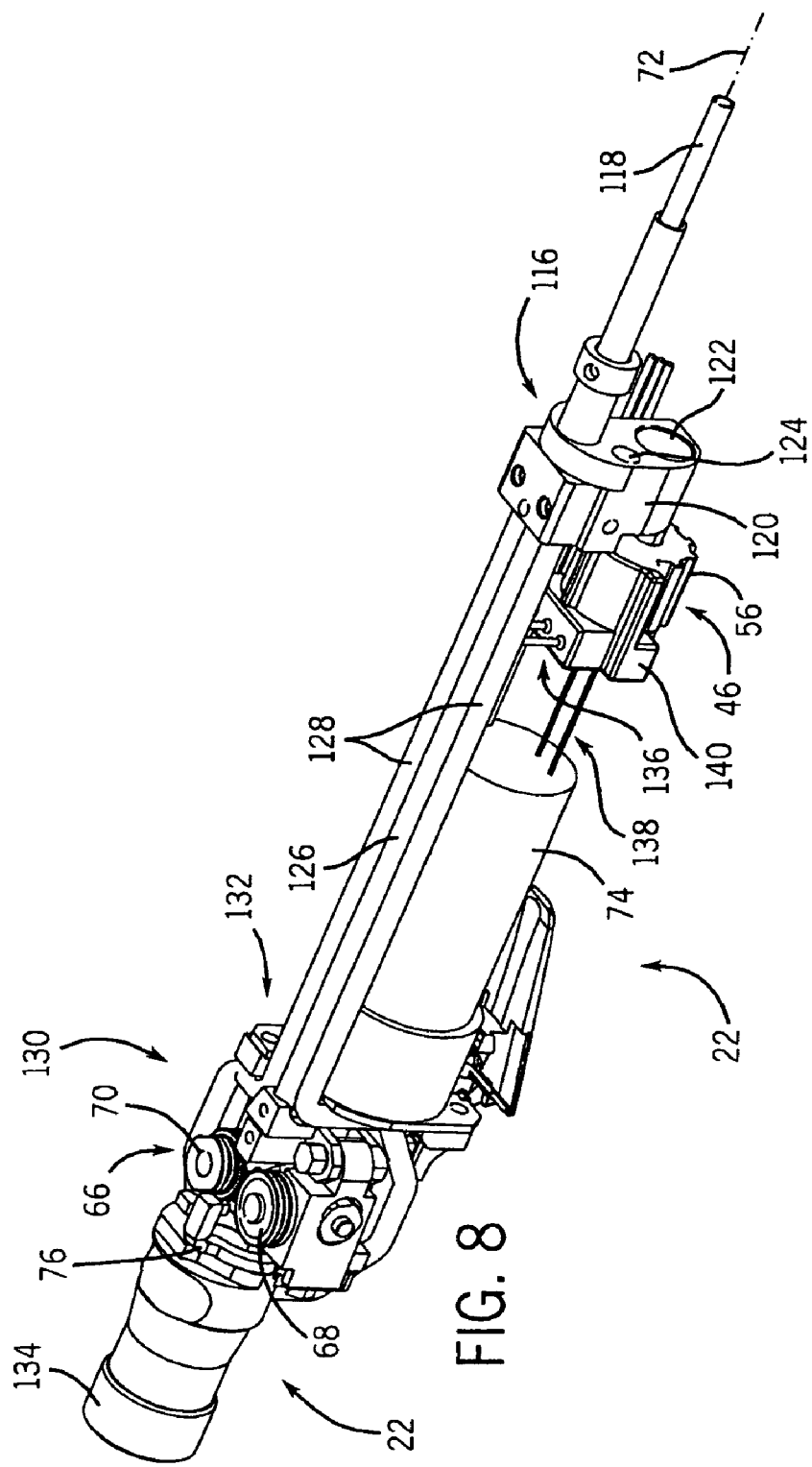
FIG. 8 is an isometric view of the torch assembly shown in FIG. 2 with the housing removed therefrom.

FIG. 8 shows a perspective view of torch assembly 22 with the housing removed therefrom. As shown in FIG. 8, cable 20, shown in FIG. 1, has been removed from a first end 116 of torch assembly 22. A liner 118 extends from a connection block 120 of torch assembly 22. Liner 118 communicates consumable weld wire from a welding device to torch assembly 22. Connection block 120 has a first recess 122 and a second recess 124 formed therein. First recess 122 is constructed to connect torch assembly 22 to weld power and second recess 124 is constructed to fluidly connect torch assembly 22 to a supply of weld gas. A torch weld wire tube 126 and a pair of torch gas tubes 128 connect connection block 120 to a second end 130 of torch assembly 22. Weld wire tube 126 is generally aligned between liner 118 and a space 132 between first feed roll 68 and second feed roll 70. Weld wire tube 126 guides consumable weld wire 72 through torch assembly 22 to drive assembly 66 and communicates weld power through torch assembly 22.

The pair of torch gas tubes 128 also communicates weld power through torch assembly 22 and communicate weld gas from connection block 120 to second end 130 of torch assembly 22. Torch gas tubes 128 curve about drive assembly 66 and communicate the weld power carried thereon and weld gas carried therein to a barrel end 134 of torch assembly 22. Passing weld gas through both pair of torch gas tubes 128 provides for efficient cooling of torch assembly 22 during welding-type processes. Such a construction allows torch assembly 22 to operate at greater weld powers compared to torch assemblies having only one weld gas passage.

Feed control 46 controls the rate of passage of consumable weld wire through torch assembly 22. Feed control 46 includes a first set of connectors 136 and a second set of connectors 138. First set of connectors 136 communicates to a controller disposed in power source 12 via cable 20. The controller disposed in power source 12 communicates a desired power signal as determined by the setting of feed control 46 to motor 74 of drive assembly 66 via second set of connectors 138. Alternatively, power is communicated to a controller 140 of torch assembly 22 from first set of connectors 136. Second set of connectors 138 communicate a variable power signal from controller 140 to motor 74 of drive assembly 66. Dial 56 is rotationally connected to controller 140 and varies the power provided from controller 140 to motor 74. Operator adjustment of dial 56 adjusts the operating speed of motor 74 and thereby adjusts the rotational speed of second feed roll 70. Rotation of dial 56 allows an operator to adjust the speed at which consumable weld wire 72 is passed through torch assembly 22 and delivered to a weld. Positioning feed control 46 on torch assembly 22 allows an operator to quickly and efficiently adjust the rate of delivery of consumable weld wire 72 to a weld. The construction of feed control 46 is described further with respect to FIGS. 12-14.

FIG. 9 shows barrel assembly 28 attached to barrel end 134 of torch assembly 22. Barrel assembly 28 has a torch end 150 constructed to operatively engage barrel end 134 of torch assembly 22. Collar 58 removeably secures barrel assembly 28 to torch assembly 22. The operative engagement between barrel assembly 28 and torch assembly 22 fluidly communicates weld gas, consumable weld wire 72, and weld power from torch assembly 22 through barrel assembly 28 and to a work end 152 of barrel assembly 28. A guide tube 154 extends from torch end 150 of barrel assembly 28 and passes through a barrel frame 156. Barrel frame 156 has a plurality of grooves 158, 160, 162, 164 formed therein. Grooves 160, 164 each have a seal 168, 170 positioned therein, respectively. Grooves 160, 164 generally flank groove 162. At least one orifice 172 is formed in groove 162 and is constructed to pass weld gas radially through barrel frame 156. Seals 168, 170 generally flank groove 162 and sealingly connect orifice 172 to a supply of weld gas provided from torch assembly 22.

An insulator 174 is positioned about barrel frame 156 and has a flange 176 extending therefrom. A sleeve 178 is positioned about frame 156 and has a first end 180 that generally abuts flange 176 of insulator 174 and a second end 182 that generally abuts a barrel collar 184. Optionally, a plurality of vent holes 186 are formed through sleeve 178 proximate second end 182. A nozzle 188 is removably attached to barrel assembly 28 at work end 152. Consumable weld wire 72 uninterruptedly passes through barrel assembly 28 and exits barrel assembly 28 through nozzle 188.

FIG. 10 shows an exploded view of the components of barrel assembly 28. Guide tube 154 is slidingly received in barrel frame 156. Seals 168, 170 have been removed from grooves 160, 164, respectively. Barrel frame 156 has a first shoulder 190 near groove 164 and a second shoulder 192 at an end 194 of barrel frame 156. First shoulder 190 of barrel frame 156 slidingly receives insulator 174 and generally concentrically aligns insulator 174 on barrel frame 156 when the insulator is positioned thereon. Insulator 174 has a body 196 having a torch end 198 and a barrel end 200. Flange 176 extends from body 196 between torch end 198 and barrel end 200. Barrel end 200 of insulator 174 is constructed to receive a first spacer 202 thereabout. First end 180 of sleeve 178 is snuggly received about first spacer 202. Alternatively, first spacer 202 could be constructed to directly engage barrel frame 156 proximate barrel end 200 of insulator 174. A second spacer 204 is constructed to slidingly receive barrel frame 156 and have second end 182 of sleeve 178 positioned thereabout. Alternatively, sleeve 178 of barrel frame 156 could include bosses formed thereon to maintain the separation therebetween. Barrel collar 184 has an opening 206 formed therethrough. Opening 206 is constructed to allow end 194 of barrel frame 156 to pass therethrough and has a ridge 208 formed thereon. Ridge 208 is constructed to snuggly engage second end 182 of sleeve. A diffuser 210 includes a plurality of gas outlets 212 and operatively engages end 194 of barrel frame 156. Diffuser 210 is constructed to axially receive nozzle 188 thereabout.

FIG. 11 shows a cross-sectional view of assembled barrel assembly 28. As shown in FIG. 11, guide tube 154 extends through barrel assembly 28 to diffuser 210 and is constructed to pass a consumable weld wire thereto. Diffuser 210 includes a threaded recess 214 to removably connect a tip (not shown) thereto. Barrel frame 156 includes a plurality of tubes 216, 218, and 220 extending therethrough. Tube 216 is concentrically positioned about guide tube 154 and electrically isolates guide tube 154 from barrel assembly 28. Tube 218, or a headtube, communicates welding-type power through the barrel assembly to diffuser 210. Tube 220 is positioned about tube 218 and isolates tube 218 from the outer surfaces of barrel assembly 28. A gas passage 222 is formed between tube 216 and tube 218 and fluidly connects orifice 172 with diffuser 210. A head fitting 224 engages tubes 216, 218, and 220 and aligns the tubes to maintain the separation between tubes 216 and 218 thereby maintaining gas passage 222. Although only one is visible, head fitting 224 includes a plurality of ports 226 radially positioned between head fitting 224 and tube 216. Plurality of ports 226 fluidly connect the flow of gas of gas passage 222 and diffuser 210. Diffuser 210 passes gas provided from gas passage 222 through gas outlets 212. Passage of gas through gas outlets 212 floods a nozzle chamber 228 with weld gas for use during a welding process.

Sleeve 178 is snuggly retained between flange 176 of insulator 174 and ridge 208 of barrel collar 184. Spacers 202, 204 cooperatively support ends 180, 182 of sleeve 178 and maintain a gap 230 between sleeve 178 and barrel frame 156. Gap 230 forms a thermal separation between sleeve 178 and barrel assembly 28. That is, the heat associated with barrel frame 156 is prevented from transmitting to sleeve 178, or the outer surface of the barrel assembly. Such a construction provides a torch assembly having a lower barrel assembly operating surface temperature. Accordingly, operator exposure to increased barrel assembly temperatures is decreased thereby providing a torch assembly that is comfortably used for extended periods of welding operation.

Maintaining the comparatively lower operating temperature of barrel assembly 28 can be even further reduced by providing sleeve 178 with optional vent holes 186. Vent holes 186 extend radially through sleeve 178 and fluidly connect gap 230 to atmosphere. Such a construction provides that any heat that may accumulate in gap 230 is allowed to escape therefrom. Such a construction reduces the thermal energy that is contained within the barrel assembly and provides for even greater cooling of barrel assembly 28.

FIG. 12 shows feed control 46 removed from torch assembly 22. Dial 56 is slideably positioned about a stem 232 of controller 140. Controller 140, positionable in power source 12 or torch assembly 22, delivers a variable output power to second set of connectors 138 as determined by feed control 46. Rotation of stem 232 controls the output power delivered from second set of connectors 138. Dial 56 includes a plurality of grooves 234 formed therein. Grooves 234 provide convenient and efficient manipulation of dial 56 by an operator wearing a welding-type glove. Dial 56 has an opening 238 formed therethrough. Opening 238 is constructed to operatively connect dial 56 to stem 232. Opening 238 of dial 56 includes a flat section 240 constructed to engage a flat portion 242 of stem 232. Such engagement rotates stem 232 in response to operator rotation of dial 56. Alternatively, dial 56 includes a set screw 244 constructed to engage flat portion 242 of stem 232. Either construction operatively connects dial 56 to stem 232 of controller 140. Controller 140 includes a shroud 246 that extends from a body 248 of the controller. Shroud 246 isolates dial 56 from an interior of the torch assembly when feed control 46 is connected thereto. Such a construction prevents debris that may accumulate in grooves 234 from being transmitted into the torch assembly during rotation of dial 56.

As shown in FIG. 13, body 248 of controller 140 includes a shank portion 249 extending therefrom about stem 232. Shank portion 249 includes a plurality of threads 250 formed thereabout. A feed control sleeve 252 has a threaded opening 254 formed therethrough. Threaded opening 254 is constructed to threadingly connect feed control sleeve 252 to body 248 about shank portion 249. Stem 232 extends from controller 140 and rotates relative to body 248 and sleeve 252. Alternatively, rather than the threaded engagement between feed control sleeve 252 and controller 140, feed control sleeve 252 could be secured to body 248 with a keyed engagement, a set screw connection, or a non-rotatably shaped engagement therebetween. A pair of grooves 256 is formed about an outer surface 258 of sleeve 252. A resistance device 260, such as an O-ring, is positioned in each groove 256. Dial 56 includes a recess 262 formed therein. Recess 262 is constructed to be positioned snuggly about sleeve 252 when resistance devices 260 are positioned in grooves 256.

FIG. 14 shows a cross-sectional view of assembled feed control 46. As shown, sleeve 252 is threadingly connected to shank portion 249 of body 248 of controller 140. Resistance devices 260 are snuggly received in grooves 256 of sleeve 252. Recess 262 of dial 56 is positioned about sleeve 252 and frictionally engages resistance devices 260. Dial 56 is operatively connected to stem 232 of controller 140 by set screw 244. Such engagement ensures that operator rotation of dial 56 results in rotation of stem 232 and thereby adjusts the output power delivered from controller 140 via second set of connectors 138. The frictional engagement between resistance devices 260 and dial 56 prevents inadvertent of unintentional rotation of stem 232. Such a construction prevents any unintentional adjustment of the output power delivered from feed control 46. As such, once an operator has determined an optimum or desired wire feed speed, vibration or movement of the torch assembly will not change the wire feed speed from the desired speed. Additionally, it is further understood that the degree of resistance to the rotation of dial can be quickly and efficiently adjusted. That is, by simply changing the size and/or material of resistance devices 260, more or less resistance to movement can be provided to dial 56. It is further understood that although two resistance devices 260 and corresponding grooves 256 are shown, manipulation of the size/material of the resistance devices could provide adequate resistance to movement of dial 56 with a single resistance device.

Therefore, one embodiment of the present invention includes a torch assembly having a first feed roll and a second feed roll attached to a body of the torch assembly. The second feed roll is movable between a feed position and a thread position. The torch assembly includes a control constructed to move the second feed roll and a lock. The lock is constructed to selectively maintain the second feed roll in the thread position.

Another embodiment of the present invention includes a welding torch having a wire feeder connected to a body. The wire feeder includes a first roll, a second roll, and a lever. The lever is pivotably connected to the body and is constructed to operatively engage at least one of the first roll and the second roll. The lever is biased out of engagement with at least one of the first roll and the second roll and securable in an engaged position.

A further embodiment of the present invention includes a welder having a torch connected to a power source. The power source is constructed to generate a power signal suitable for welding applications. A wire feeder is attached to the torch and includes a pair of rolls. The pair of rolls is constructed to pull a consumable weld wire to the torch. A link is pivotably connected to the torch and movable between a first position and a second position. When the link is in the second position, the link maintains a hands-free separation of the pair of rolls.

The present invention has been described in terms of the preferred embodiment, and it is recognized that equivalents, alternatives, and modifications, aside from those expressly stated, are possible and within the scope of the appending claims.

What is claimed is:

1. A torch assembly comprising:
   a body
   a first feed roll attached to the body;
   a second feed roll attached to the body and movable between a feed position and a thread position, wherein the second feed roll rotates around a first axis;
   a mechanical component constructed to move the second feed roll, wherein the mechanical component further comprises a first end pivotally attached to the body, a second end having a handle, and a bearing surface between the first end and the second end, the bearing surface constructed to move the second feed roll responsive to movement of the mechanical component, wherein the mechanical component pivots around a second axis generally perpendicular to the first axis; and a lock constructed to selectively maintain the second feed roll in the thread position.

2. The torch assembly of claim 1 wherein the lock is further defined as a shoulder on the body, the shoulder constructed to receive a portion of the mechanical component thereon.

3. The torch assembly of claim 1 wherein the handle extends in a direction generally parallel to an axis of rotation of the mechanical component.

4. The torch assembly of claim 1 further comprising a spring attached to the body and constructed to bias at least one of the second feed roll to the feed position and the mechanical component in a direction out of contact with the second feed roll.

5. The torch assembly of claim 1 further comprising a housing formed about the body, the housing having an opening formed therein to expose at least one of the mechanical component, the first feed roll, and the second feed roll.

6. The torch assembly of claim 5 further comprising a tube assembly constructed to be attached to the body proximate an end of the housing, the tube assembly constructed to guide a consumable weld wire out of the torch and having a casing and an insulator and a spacer disposed therebetween to maintain a gap between the insulator and the casing.

7. A torch assembly, comprising:

a body;

a wire feeder coupled to the body and comprising a first roll and a second roll, wherein the first roll rotates around a first axis; and a lever pivotably connected to the body and moveable between a first position and a second position, such that the first position operatively engages the first roll of the wire feeder and the second position operatively disengages the first roll of the wire feeder, wherein the lever is biased to the first position, and securable in the second position via a retention component, wherein the lever is pivotable around a second axis generally perpendicular to the first axis, wherein the lever further comprises a first end pivotably connected to the body, a second end operatively rotatable about the first end, and a bearing surface between the first end and the second end, the bearing surface constructed to operatively disengage the first roll by moving the first roll to the second position.

8. The welding torch of claim 7, further comprising a shoulder formed on the body, the shoulder constructed to retain the lever in an engaged position when the lever is engaged therewith.

9. The welding torch of claim 7, further comprising a barrel assembly attached to the body, the barrel assembly having a tube and a sleeve and a cavity maintained therebetween.

10. The welding torch of claim 7, further comprising a cable having a first end connectable to the body and a second end.

11. The welding torch of claim 7, wherein the wire feeder further comprises a second roll, wherein the second roll is further defined as a drive roll and the first roll is further defined as an idler drive roll, the idler drive roll coupled to an arm, the arm constructed to engage the lever and move the idler drive roll relative to the drive roll during movement of the lever.

12. The welding torch of claim 11, further comprising a motor attached to the body and constructed to rotate at least one of the first and the second roll of the wire feeder to move a consumable weld wire therepast.

* * * * *